United States Patent [19]

Fukuchi

[11] Patent Number: 4,511,907
[45] Date of Patent: Apr. 16, 1985

[54] COLOR INK-JET PRINTER

[75] Inventor: Hiromichi Fukuchi, Tokyo, Japan

[73] Assignee: NEC Corporation, Tokyo, Japan

[21] Appl. No.: 543,546

[22] Filed: Oct. 19, 1983

[30] Foreign Application Priority Data

Oct. 19, 1982 [JP] Japan ................................ 57-183220

[51] Int. Cl.³ ............................................ G01D 15/18
[52] U.S. Cl. .................................. 346/140 R; 346/46; 358/75; 358/78
[58] Field of Search ...................... 346/140 R, 75, 46; 358/75, 78

[56] References Cited

U.S. PATENT DOCUMENTS 4,320,406  3/1982  Heinzl ................................ 346/140
4,413,275 11/1983  Horiuchi ............................ 358/75
4,458,265  7/1984  Yoshida ......................... 358/78 X

*Primary Examiner*—Joseph W. Hartary
*Attorney, Agent, or Firm*—Sughrue, Mion, Zinn, Macpeak, and Seas

[57] ABSTRACT

A print mechanism includes plural print heads arranged in a horizontal direction with each print head including a plurality of nozzles arranged in a vertical direction. The entire print mechanism is disposed on a carriage movable in the horizontal direction. Each of the print heads is preferably supplied with a different color ink, and the printing signals used to energize the nozzles in each print head are delayed for the second and subsequent print heads by an amount corresponding to the time required for the carriage to move horizontally through the displacement between the first print head and the second and subsequent print heads.

7 Claims, 5 Drawing Figures

COLOR INK-JET PRINTER

BACKGROUND OF THE INVENTION

The present invention relates to a color ink-jet printer which is capable of high-speed, high-quality printing and has a low cost.

One known type of color ink-jet printer employs a rotary drum. In this printer, a plurality of print heads are arranged at prescribed intervals around the circumference, or arranged at prescribed intervals in the horizontal direction, of a carriage. An electrical signal is impressed on a piezoelectric transducer made of zircon lead titanate ceramic, barium titanate ceramic, etc., and ink in an ink chamber is discharged from a nozzle by the oscillation of an oscillating plate so that a dot is printed on a sheet of recording paper. Since the plurality of print heads are arranged at prescribed intervals, the information for a plurality of lines to be printed is stored beforehand as dot information in a delay memory. Suppose, for instance, that first and second print heads are separated by a distance of n bits from each other. When a dot printed on the printing paper by the first print head reaches the point of the second print head as the drum rotates, an ink droplet is jetted from the nozzle of the second print head so that it is superimposed over the first dot to print it. The delay time required during this operation corresponds to a delay memory of n bits. A colored picture can be printed by repeating this print operation by three print heads using different ink colors in sequence.

With the printing mechanism described above, however, it is difficult to print at high speed, because sequential scanning is used. In addition, a mechanical printing mechanism of this type has a rather complicated structure, and therefore the cost of the apparatus tends to be very high.

An object of the present invention is to provide a high-speed, high-quality, low-cost color ink-jet printer.

Another object of the present invention is to provide a very practical and inexpensive color ink-jet printer which can print quietly on ordinary paper, owing to its multinozzle printing mechanism.

SUMMARY OF THE INVENTION

According to this invention, there is provided a color ink-jet printer comprising: a paper-feed control mechanism; a printing mechanism containing a plurality of print heads arranged in the horizontal direction, each print head including a plurality of nozzles arranged vertically substantially in the direction of the paper feed; a carriage-feed control mechanism carrying the printing mechanism, moving at a constant speed in the horizontal direction, and outputting position detection signals; a first print head recording section including a buffer circuit for temporarily storing input data transmitted from outside, a dot pattern storage circuit for converting data output from the buffer circuit into a picture dot pattern and storing it; a print head control circuit outputting timing signals for driving the print heads, in synchronization with the position detection signals from the carriage-feed control mechanism; a print head driving circuit for driving the print heads consisting of a plurality of vertically-arranged nozzles, according to dot pattern data output from the dot pattern storage circuit, in synchronization with the timing signals from the print head control circuit and a print head mechanism; a second print head recording section including a second buffer circuit, a second dot pattern storage circuit, a delay memory circuit, a second print head driving circuit, and a second print head mechanism; and a third print head recording section of the same circuit constitution as the second print head recording section.

The color ink-jet printer according to the present invention is characterized in that three on-demand multinozzle printing heads are arranged in each print head mechanism, the ink is divided into groups of, for example, cyan, magenta, and yellow for each line; subtractive primary mixtures enable high-speed, high-quality color printing; noiseless recording on ordinary paper is enabled; the density of the print and the diameter of the ink dots can be made uniform; and thus high-quality color printing can be obtained.

BRIEF DESCRIPTION OF THE DRAWINGS

The features and advantages of this invention will be understood from the detailed description of a preferred embodiment of this invention taken in conjunction with the accompanying drawings, wherein.

DETAILED DESCRIPTION OF THE INVENTION

Figure 1:
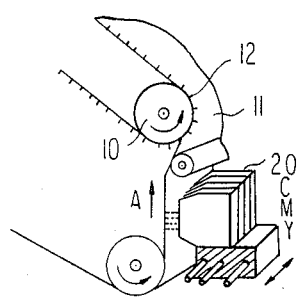
FIG. 1 is a perspective view of a paper-feed mechanism and printing mechanism of an embodiment of the present invention.
Figure 2:
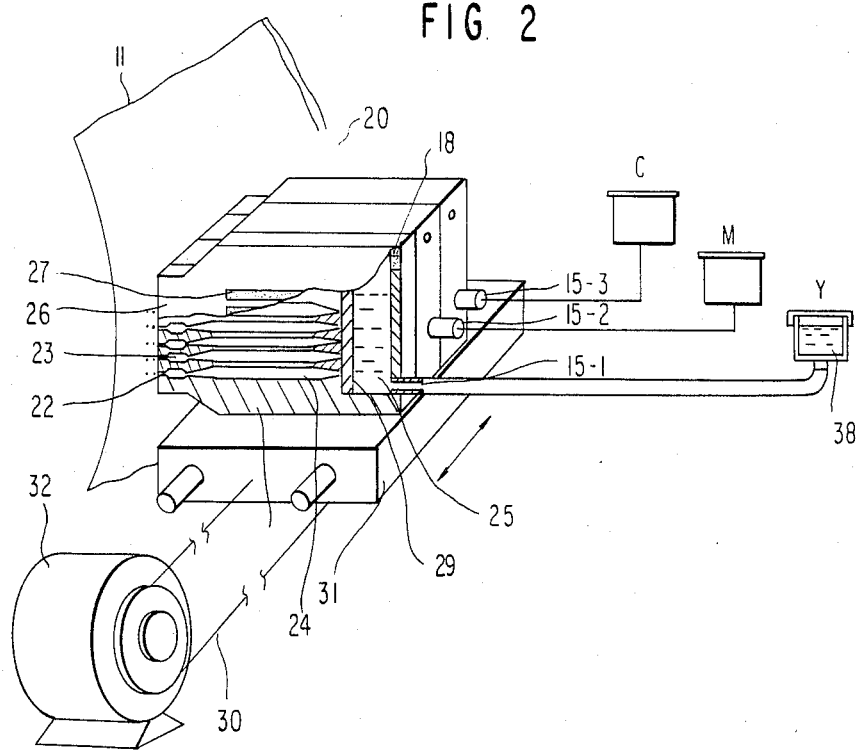
FIG. 2 is a schematic perspective view of the printing mechanism of the embodiment.

Referring to FIGS. 1 and 2, a reference numeral 10 denotes a paper-feed control mechanism wherein a driving source such as a stepping motor and a DC/AC servomotor (not shown in the figures) is used, and a sheet of printing paper 11 is moved in the direction of the arrow A by a sprocket mechanism 12 according to paper-feed instructions. A reference numeral 20 denotes a plurality of print head mechanisms. A jet channel substrate 21 for a print head is constituted by a plurality of nozzles 22 arranged at prescribed intervals in the vertical direction, ink chambers 24, capacity chambers 23 of a small capacity, each located between a nozzle 22 and an ink chamber 24, a thin layer of ink supply unit 29, and an ink reservoir 25 having an air vent 18 in the upper part thereof and an ink supply port 15 in the lower part. A carriage-feed control mechanism 30 is formed of a driving source 32 including a driving control member such as a stepping motor. The mechanism 30 reciprocates in the horizontal direction, a carriage-feed block 31 carrying the plurality of print head mechanisms 20.

Figure 3:
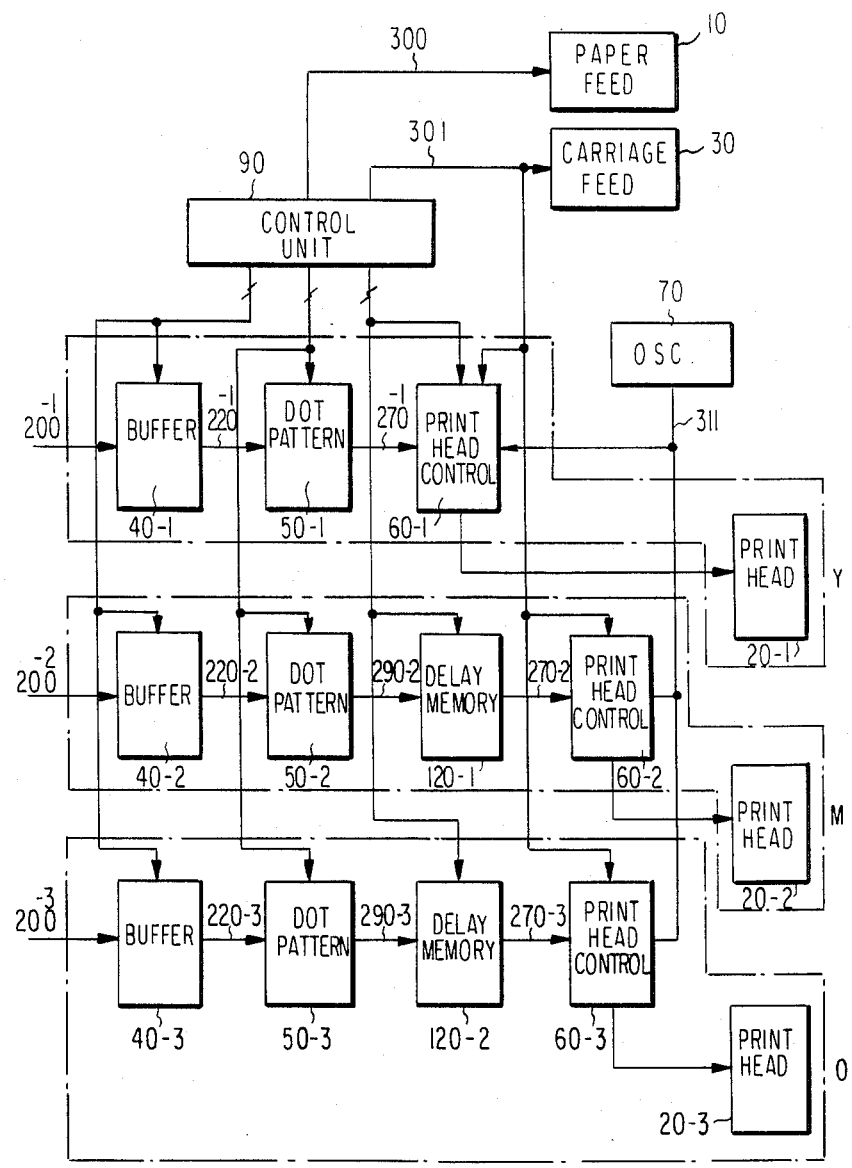
FIG. 3 is a block diagram of the system configuration of the embodiment.
Figure 4:
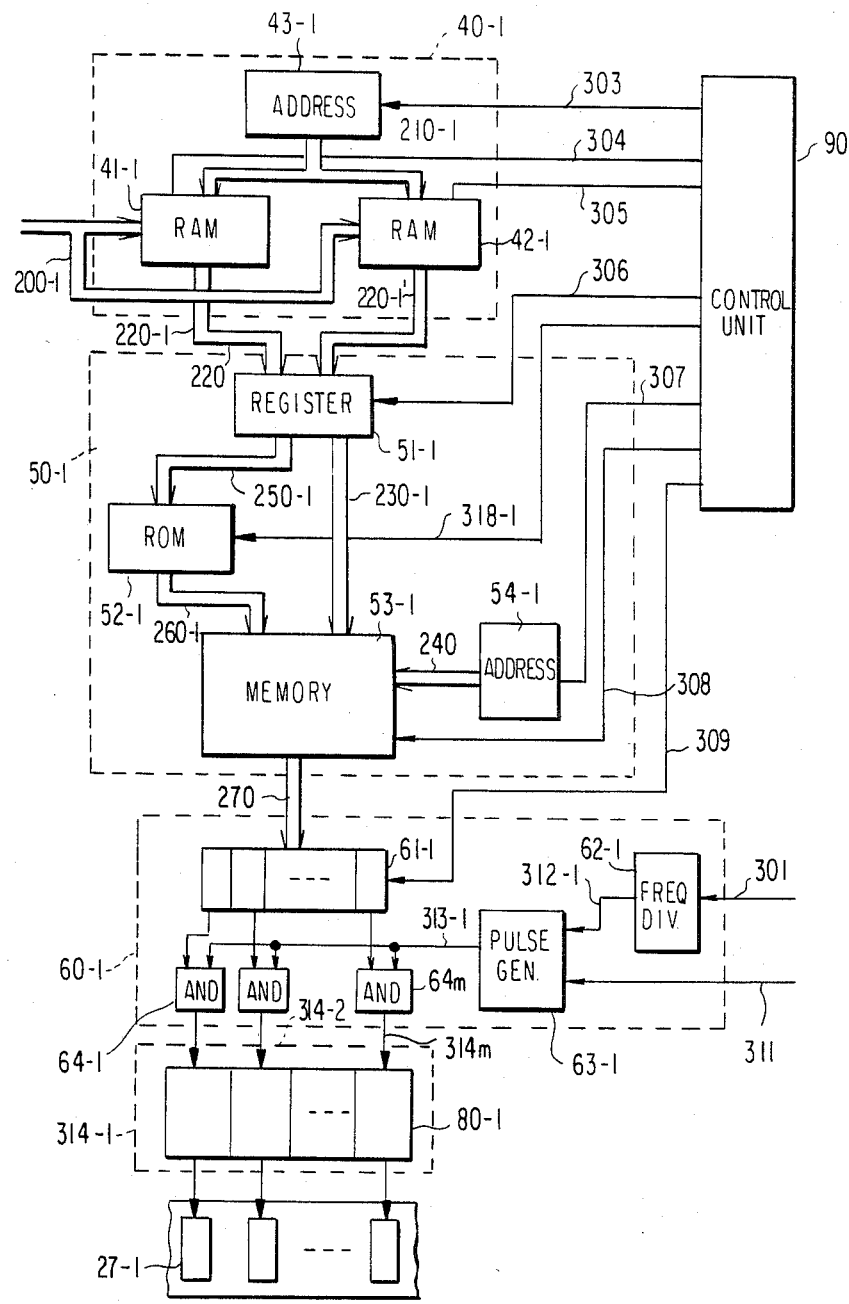
FIG. 4 is a block diagram of details of the first print head recording section in the embodiment.
Figure 5:
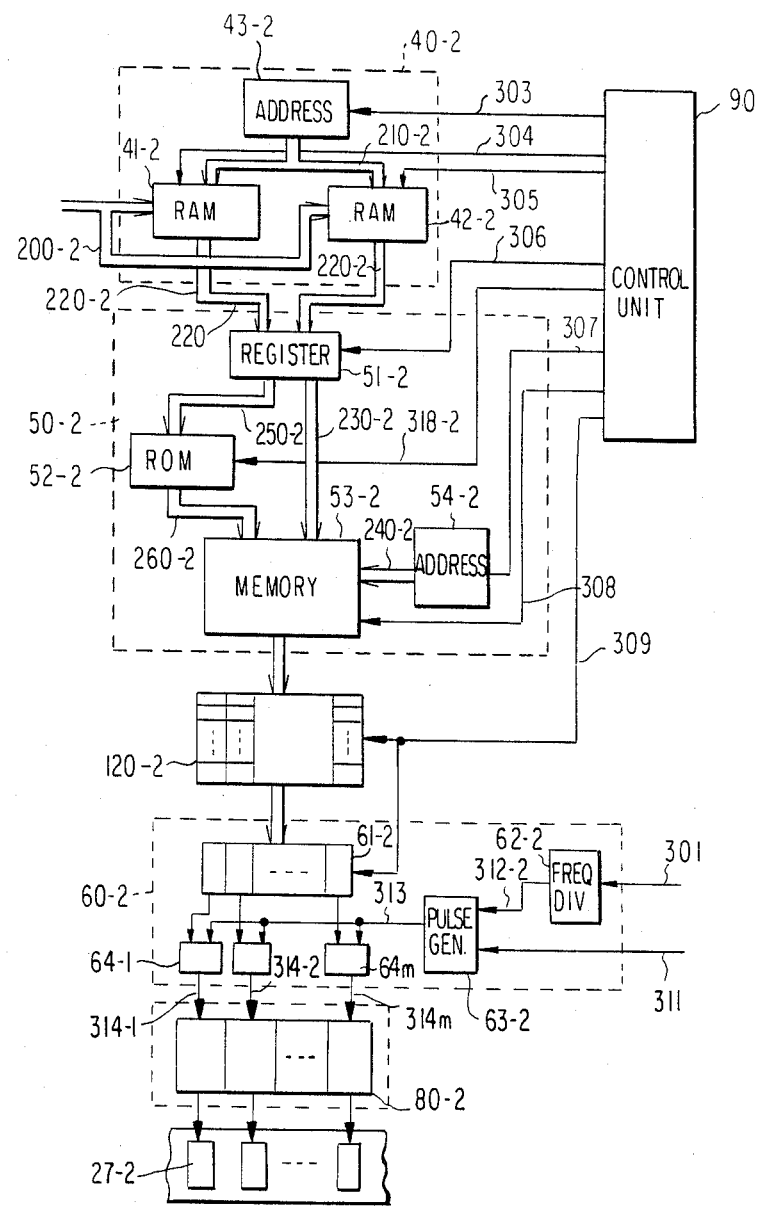
FIG. 5 is a block diagram of details of the second and third print head recording sections in the embodiment.

Each of the print head mechanisms 20 has a structure wherein a flexible plate 26 is stuck onto the jet channel substrate 21, and piezoelectric transducers 27 are fixed at positions corresponding to each of the ink chambers 24. An ink supply orifice 15 (15-1, 15-2, 15-3) for each print head communicates with an ink tank 38 wherein ink of one of the three colors yellow, magenta, and cyan is stored. The representation of different colors is usually made by subtractive mixtures of the three colored inks (yellow, magenta, and cyan). Black ink can be used when the brightness of colors is represented, and the corresponding description is omitted herein. Referring to FIGS. 3 and 4, each buffer circuit unit 40 (40-1, 40-2, 40-3) temporarily stores input data sent from outside over a line 200 (200-1, 200-2, 200-3). Each unit 40 consists of two RAMs 41 (41-1, 41-2, 41-3) and 42 (42-1, 42-2, 42-3) for reading out and reading in data, and an address generation circuit 43 (43-1, 43-2, 43-3) which is provided for generating memory addresses for the reading out and writing in of data of and to the RAMs 41 and 42. A dot pattern storage circuit 50 (50-1, 50-2, 50-3) temporarily stores output data from RAMs 41 and 42. This unit 50 consists of a register group 51 (51-1, 51-2, 51-3), a ROM 52 (52-1, 52-2, 52-3) which uses the contents of the register group 51 as addresses for converting, for instance, signals of ASCII or JIS codes into decoded signals, a memory circuit 53 (53-1, 53-2, 53-3) for storing the contents of the register group 51 or the decoded signal output from the ROM circuit 52, and an address generation circuit 54 (54-1, 54-2, 54-3) for specifying memory addresses within the memory circuit 53. A reference numeral 60 (60-1, 60-2, 60-3) denotes a print head control unit, wherein the contents specified by memory addresses from the address generation circuit 54 are read out over a line 270 and set in a register group 61 (61-1, 61-2, 61-3) by instructions delivered from a control unit 90 over a line 309. The number of registers in this group 61 is at least the same as the number m of nozzles of one print head. The control unit 90 is usually a microcomputer which can be bought easily. A program for controlling the recording is stored therein beforehand, and the color ink-jet printer performs the recording according to instructions based on this program.

The first print head recording section is constituted by the buffer circuit 40-1, the dot pattern storage circuit 50-1, the print head control circuit 60-1, a print head driving circuit 80-1, and the print head 20-1. The second and third print head recording sections each comprise the corresponding buffer circuit 40 (−2, −3), the dot pattern storage circuit 50 (−2, −3), the print head control circuit 60 (−2, −3), a print head driving circuit 80 (−2, −3), and the print head 20 (−2, −3), and also a delay memory unit 120 (−2, −3) which is inserted between the dot pattern storage circuit 50 (−2, −3) and the print head control circuit 60 (−2, −3) and generates, under the control of the control unit 90, dot shifts corresponding to the distances between the first print head 20-1 and the second and third print heads 20 (−2, −3) in order to superimpose their dots over a dot recorded on the recording paper 11 by the first print head 20-1, when printing and recording.

Next, a description will be made of the operation of a print head wherein an ink droplet is jetted according to a single pulse signal. When an electrical signal, is impressed on the piezoelectric transducer, the shape of the flexible plate 26 changes rapidly, causing a change in the capacity of the ink chamber 24, and thus generating a pressure wave in the ink chamber 24. An ink droplet is discharged by this pressure wave at some initial speed, e.g. 1.5–5 m/sec, from the nozzle 22 through the capacity chamber 23. That is, an ink droplet sticks onto the printing paper sheet 11 for each one electrical pulse signal. Therefore, by driving the piezoelectric transducer 27 in accordance with a dot pattern stored in the memory circuit 53 (−1, −2, −3), a picture can be printed on the recording paper 11.

The frequency of ink droplets per second is 3000–10000 dots/sec, and this is dependent on the shape of the nozzle channel, the viscosity of the ink, the electrical pulse waveform, etc. In addition, the diameter of the ink droplet jetted from the nozzle 22 can be controlled in accordance with the amplitude of the electrical pulse signals. Therefore, the diameters of ink droplets discharged from a plurality of print heads can be easily adjusted to be uniform, and thus a high-quality picture can be obtained.

The following is a description of the operation whereby a colored picture is recorded.

According to paper-feed instructions delivered from the control unit 90 over a line 300, the paper-feed control mechanism 10 operates to intermittently feed the printing paper 11 one line at a time. At the same time, the driving source 32 operates according to instructions delivered to the carriage-feed control mechanism 30 from the control unit 90 over a line 301 so that the carriage-feed block starts a reciprocal motion at a prescribed speed in the horizontal direction. When data of color information is input from outside to the buffer circuit unit 40 over a line 200, a memory address at which the input data is stored temporarily, or from which it is to be read out, is input to RAM 41 or 42 over a line 210 by the address generation unit 43 based on specifications sent from the control unit 90 over a line 303. First a readout instruction is delivered from the control unit 90 over a line 304 so that the contents of the specified memory address output, and this is stored in the register group 51 according to a set signal delivered from the control unit 90 over a line 306. Next, a write instruction signal is delivered from the control unit 90 over the line 304, so that the input data is stored temporarily in RAM 41 (−1, −2, −3). The presence of two RAMs 41 and 42 in this embodiment enables the high-speed transmission of input data, although a single RAM would do just as well for this operation. Since the data input from outside is stored temporarily in RAM 41 and then transmitted in this way, the contents of RAM 41 are read out and the written into memory addresses specified sequentially, in a sequential and repeated manner, and the input data is transmitted to the dot pattern storage circuit 50 (−1, −2, −3). When the data stored in the register group 51 is data concerning a picture, i.e. a dot pattern itself, a memory address within the memory circuit 53 is specified by the address generation unit 54 over a line 240 according to specifications by the control unit 90 over a line 307. The contents of the memory circuit 53 are read out in synchronism with read-out pulses output from the control unit 90 over a line 308, and they are stored in the register group 61 by set pulses output from the control unit 90 over a line 309. Next, data stored in the register group 51 is stored at the same memory address of the memory circuit 53 by write-in pulses delivered from the control unit 90 over the line 308.

The memory circuit 53 must have a memory capacity of at least 4620 bits (132×7×5) when 132 ASCII characters each with a 5×7 dot matrix are printed on one line.

Driving control pulses sent to the carriage-feed control mechanism 30 over the line 301 are supplied to a frequency divider 62 (−2, −3). Detection pulse signals are counted, and every n pulses thereof, an output pulse is input to a single-pulse generation circuit 63. The time intervals between these output pulses are equivalent, when converted on the printing paper 11, to timing pulse signals corresponding to the dot resolution. When these timing pulse signals are supplied to the single-pulse generation circuit 63 over a line 312, one pulse of a signal which is input constantly via line 311 from a pulse oscillator 70 is output to a line 313 in synchronization with the timing pulse signals. Simultaneously, only those gate circuits 64 which are receiving 1's 1 from the data information stored in the register group 61 beforehand are opened, so that the pulse signals are input to the driving circuit 80, the piezoelectric transducer 27 corresponding to the driving circuit 80 is thereby excited, and thus one ink droplet is jetted so as to stick onto the printing paper 11.

By repeating the above operation while the carriage-feed block 31 moves in the horizontal direction, a plurality of lines corresponding to the plurality of nozzles arranged in the vertical direction are recorded linearly in the form of a dot pattern on the recording paper 11. By repeating this operation, picture information for ink of one color can be recorded on the paper 11.

Color printing is performed, in one embodiment of the present invention, by using ink of three colors in such a manner that yellow ink is employed for the first print head 20-1, magenta ink for the second print head 20-2, and cyan ink for the third print head 20-3. In order to form different colors using this method of mixtures of subtractive primaries, the magenta and cyan inks are superimposed sequentially in the same positions as those of the dots of yellow ink printed and recorded on the recording paper 11 by the first print head 20-1. For this purpose, a delay memory circuit 120 (−2, −3) generating dot shifts equivalent to the distances from the baseline of the first print head 20-1 to the second and third print heads (20-2, −3) is inserted between the dot pattern storage circuit 50 (−2, −3) and the print head control circuit 60 (−2, −3) in each of the second and third print head recording sections. As a result, clear color printing can be obtained by the superposition of ink of three colors: yellow, magenta, and cyan.

In ROM 52 in the dot pattern storage circuit 50, dot patterns of ASCII or JIS codes can be stored, for instance, and when the input data stored in the register group 51 is coded signals, the contents of the register group 51 are specified as memory addresses in ROM 52 via line 250, and ROM 52 then decodes these signals in accordance with instructions delivered from the control unit 90 over a line 250. The decoded signals from ROM 52 are stored in the memory circuit 53 over a line 260. That is, the present embodiment has a circuit configuration in which coded signals stored in the register group 51 are converted into decoded signals which are stored in the memory circuit 53.

As described above, the colored ink jet printer of the present invention enables high-speed, high-quality color printing by the use of a print head mechanism wherein a plurality of print heads each with a plurality of nozzles in the vertical direction are arranged in the horizontal direction. Moreover, these print heads are of a non-impact printing type, and therefore they generate little noise during recording and enable recording on ordinary paper.

In addition, the diameters of ink droplets discharged from these print heads can be made uniform by controlling the amplitude of electrical pulse signals. As the result, a uniform density of printing and high-quality pictures can be obtained. These are the advantages provided by the present invention.

What is claimed is:

1. An ink-jet printer comprising:
   a paper-feed control mechanism;
   a printing mechanism containing print heads each Provided with a plurality of nozzles arranged vertically and substantially in the direction of paper feeding;
   a carriage-feed control mechanism carrying said printing mechanism, moving at a constant speed in the horizontal direction, and outputting position detection signals;
   a buffer circuit for temporarily storing input data transmitted from outside;
   a dot pattern storage circuit for converting data output from said buffer circuit into a dot pattern and storing it;
   a print head control circuit outputting timing signals for driving said print heads, in synchronization with the position detection signals output from said carriage-feed control mechanism;
   a print head driving circuit unit for driving the print heads according to dot pattern data signals output from said dot pattern storage circuit, in synchronization with the timing signals from said print head control circuit;
   a control unit for controlling all of said circuit units;
   a first print head recording section being composed of said buffer circuit, said dot pattern storage circuit, said print head control circuit, said print head driving circuit, and a first print head mechanism wherein a plurality of nozzles are arranged in the vertical direction substantially in the direction of paper feed;
   a second print head recording section being composed of a second buffer circuit, a second dot pattern storage circuit, a second print head control circuit, a second print head driving circuit, a second print head mechanism wherein a plurality of nozzles are arranged in the vertical direction substantially in the direction of paper feed, and a delay memory circuit which is inserted between said second dot pattern storage circuit and said second print head control circuit and which generates a dot shift between the first print head mechanism acting as a baseline to the second print head mechanism in order to print and record dots at the same positions of and superimposed over dots printed and recorded on a sheet of paper by the first print head recording section; and
   a third print head recording section having a similar circuit constitution to that of said second print head recording section, the delay memory circuit in said third print head recording section being a delay memory generating a dot shift from the first print head mechanism acting as a baseline to a third print head mechanism unit.

2. The color ink-jet printer as claimed in Claim 1, wherein said print head mechanism consists of a substrate of a flat structure provided with a plurality of nozzles, pressure-generating chambers, and capacity chambers located between said nozzles and pressure generating chambers and of a capacity smaller than that of said pressure-generating chambers, and a common member supplying a thin layer of ink from channel grooves communicating with a common ink reservoir in a line in the vertical direction; a flexible thin plate fitted over said substrate, an electromechanical transducer fitted over said flexible thin plate as a means for generating pressure waves in said pressure-generating chambers, an air vent hole provided in the upper part of the common ink reservoir in said substrate, a sensing member fitted to the upper part of said common ink reservoir, and an ink tank supplying ink through an ink supply orifice provided in the lower part of said common ink reservoir.

3. The color ink-jet printer as claimed in Claim 1, wherein ink of the three colors, yellow, magenta, and cyan are stored separately in said ink tanks of said first, second, and third print head recording sections, respectively.

4. An ink jet printer, comprising:
a paper-feed mechanism for feeding paper in a first direction past a print station;
a printing mechanism comprising at least first and second print heads arranged in a second direction transverse to said first direction, each of said print heads comprising a plurality of nozzles arranged substantially along said first direction;
a carriage feed mechanism for moving said printing mechanism along said second direction and for providing position detection signals corresponding to the position of said printing mechanism along said second direction;
a print head control circuit for providing enabling signals in synchronization with said position detection signals;
first storage means for storing data representing a dot pattern to be printed by said first print head;
second storage means for storing data representing a dot pattern to be printed by said second print head;
first reading means for reading said data out of said first storage means;
first driving means for driving said plurality of nozzles of said first print head in synchronism with said enabling pulses and in accordance with said data read out of said first storage means;
second reading means for reading said data out of said second storage means;
delay means for delaying the data read out of said second storage means by an amount corresponding to the time required for said carriage feed mechanism to move said printing mechanism a distance corresponding to the separation along said second direction between said first and second print heads; and
second driving means for driving said second print head in synchronism with said enabling pulses and in accordance with the data output of said delay means.

5. An ink jet printer as claimed in claim 4, wherein said printing mechanism further includes a third print head having a plurality of nozzles arranged substantially along said first direction, said printer further comprising third storage means for storing data representing a dot pattern to be printed by said third print head, third reading means for reading said data out of said third storage means;
second delay means for delaying the data read out of said third storage means by an amount corresponding to the time required for said carriage to move said printing mechanism a distance corresponding to the separation along said second direction between said first and third print heads; and
third driving means for driving the plurality of nozzles of said third print head in synchronization with said enabling pulses and in accordance with the data output of said second delay means.

6. An ink jet printer as claimed in claim 5, wherein said first, second and third print heads print dot patterns of first, second and third colors, respectively.

7. An ink jet printer as claimed in claim 4, wherein each of said print heads comprises a plurality of nozzles arranged in said first direction, a plurality of ink chambers for supplying ink to respective nozzles, ink supply means common to each of said chambers for providing ink to said chambers, a flexible member common to all chambers and adjacent each chamber, and respective electromechanical means adjacent each said chamber for deforming said flexible member adjacent respective chambers to generate pressure within said respective chambers and thereby force ink through an associated nozzle.

* * * * *

UNITED STATES PATENT AND TRADEMARK OFFICE
CERTIFICATE OF CORRECTION

PATENT NO. : 4,511,907

DATED : April 16, 1985

INVENTOR(S) : Hiromuchi FUKUCHI, Tokyo Japan

It is certified that error appears in the above-identified patent and that said Letters Patent is hereby corrected as shown below:

Column 4, line 30, after "address", insert --are--.

Column 5, line 7, after "1's", delete "1".

Column 6, line 4, "Provided" should be --provided--.

Signed and Sealed this

Twentieth Day of August 1985

[SEAL]

Attest:

DONALD J. QUIGG

Attesting Officer     Acting Commissioner of Patents and Trademarks